United States Patent
Bhattacharjee et al.

(10) Patent No.: US 8,126,929 B2
(45) Date of Patent: Feb. 28, 2012

(54) METHOD AND APPARATUS FOR ENCODING LIST OF VARIABLE LENGTH STRUCTURES TO SUPPORT BI-DIRECTIONAL SCANS

(75) Inventors: Bishwaranjan Bhattacharjee, Yorktown Heights, NY (US); Lipyeow Lim, Hawthorne, NY (US); Timothy Ray Malkemus, Leander, TX (US); George Andrei Mihaila, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 12/057,012

(22) Filed: Mar. 27, 2008

(65) Prior Publication Data
US 2009/0248724 A1  Oct. 1, 2009

(51) Int. Cl.
*G06F 17/30* (2006.01)
(52) U.S. Cl. ........ 707/802; 707/694; 707/703; 707/791; 707/792; 707/803
(58) Field of Classification Search .......... 707/791, 707/792, 802, 803, 694, 703
See application file for complete search history.

(56) References Cited

U.S. PATENT DOCUMENTS

| | | | |
|---|---|---|---|
| 3,938,105 A * | 2/1976 | Lechner | 711/220 |
| 6,578,026 B1 | 6/2003 | Cranston et al. | |
| 6,647,386 B2 | 11/2003 | Hollines, III et al. | |
| 2006/0036593 A1* | 2/2006 | Dean et al. | 707/4 |
| 2006/0115000 A1 | 6/2006 | Otsuka | |
| 2008/0016066 A1 | 1/2008 | Kuznetsov et al. | |
| 2008/0111721 A1* | 5/2008 | Reznik | 341/67 |

OTHER PUBLICATIONS

G. Antoshenkov et al., "Query Processing and Optimization in Oracle Rdb," The VLDB Journal, 1996, pp. 229-237, vol. 5.

* cited by examiner

*Primary Examiner* — Shahid Alam
*Assistant Examiner* — Andalib Lodhi
(74) *Attorney, Agent, or Firm* — Mark Wardas; Ryan, Mason & Lewis, LLP

(57) ABSTRACT

Techniques are disclosed for encoding a variable length structure such that it facilitates forward and reverse scans of a list of such structures as needed. While the techniques are applicable to a wide variety of applications, they are particularly well-suited for use with structures such as those found in compressed database indexes. For example, a computer-implemented method for processing one or more variable length data structures includes the following steps. Each variable length data structure is obtained. Each variable length structure comprises one or more data block. A variable length encoding process is applied to the one or more blocks of each variable length data structure which comprises setting a continuation data value in each block to a first value or a second value, wherein the setting of the continuation data values enables bi-directional scanning of each variable length structure.

20 Claims, 6 Drawing Sheets

METHOD AND APPARATUS FOR ENCODING LIST OF VARIABLE LENGTH STRUCTURES TO SUPPORT BI-DIRECTIONAL SCANS

FIELD OF THE INVENTION

The present invention generally relates to the field of databases, and more particularly relates to accessing elements of a list of variable length structures in forward and reverse directions (bi-directional), wherein such type of access can be found in a compressed index of a database system.

BACKGROUND OF THE INVENTION

It is quite common to find cases where one has to store and then access a list of variable length structures. The accesses of the elements could be in forward and reverse directions. An example where this is needed is in compressed database indexes.

A database index stores an efficient mapping between a key to a list of row identifiers (RIDs). In compressed indexes, these lists of RIDs are often encoded using variable length encoding schemes. Here, the length of the RID is a function of its value. The value could be its original RID value or that obtained by a delta encoding of the original RID value and/or other compression scheme applied to it. As is known, delta encoding is a technique for storing or transmitting data in the form of differences between sequential data values, rather than the complete set of data values. The differences are referred to as "delta encoded integers" or, more simply, "deltas." Delta encoded lists of RIDs may then be further compressed using a plurality of other compression methods. One exemplary method is dictionary-based compression, where common bit patterns in the deltas are replaced with a short codeword.

While accessing data via these compressed indexes, one needs to be able to traverse the keys and RID lists in forward and reverse orders. Consider an index on a table column called ship_date. One can expect a lot of items were shipped on the same date and they will have the same ship_date. In such a case, the index would have the key (e.g., ship_date=01/01/2008) followed by a list containing the record identifiers of those records which have this value. Immediately following would be another key and its RID lists in increasing logical order of the keys.

A user might want to know how many items were shipped for each date of 2008 in increasing or decreasing order of the dates. The former (i.e., increasing order) could be easily answered by a traversal of the index in the forward direction while picking up the count of records for each key in that range. For the latter (i.e., decreasing order), one could traverse the index in reverse direction and answer the query. Thus, the ability to traverse the key and RID lists in forward and reverse direction is very important for query processing.

Apart from the variable length record identifiers (RIDs), the list could also contain information describing the state of the record. This could be in data structures which may be of fixed length and are called RIDFlags for this discussion. The RIDFlags could follow each RID in the list.

The conventional form of variable length encoding breaks the structure into bytes (or blocks) and uses a bit in every byte (or block) to indicate if the byte (or block) is the final byte (or block) or a continuation byte (or block). While reading the data, this bit is used to put bytes (or blocks) together and form the complete variable length data item. This is easy to do when one is traversing the list in a forward direction but becomes difficult to do in a reverse direction. It becomes impossible to do that when the variable length items (such as RIDs) are intermixed with other fixed length items (such as RIDFlags). The reverse scan would not be able to distinguish between a RIDFlag from an encoded byte (or block) of the RID.

SUMMARY OF THE INVENTION

Principles of the invention provide techniques for encoding a variable length structure such that it facilitates forward and reverse scans of a list of such structures as needed. While the techniques are applicable to a wide variety of applications, they are particularly well-suited for use with structures such as those found in compressed database indexes.

In one embodiment, a computer-implemented method for processing one or more variable length data structures comprises the following steps. Each variable length data structure is obtained. Each variable length structure comprises one or more data block. A variable length encoding process is applied to the one or more blocks of each variable length data structure which comprises setting a continuation data value in each block to a first value or a second value, wherein the setting of the continuation data values enables bi-directional scanning of each variable length structure.

When a variable length data structure has more than one block, the application of the variable length encoding process may comprise setting the continuation data values in the first block and the last block of the variable length structure to the first value. Further, when the variable length data structure has more than one block, the application of the variable length encoding process may comprise setting the continuation data value in any intermediate block of the variable length structure to the second value.

When a variable length data structure has one block, the application of the variable length encoding process may comprise setting the continuation data value in the one block of the variable length structure to the second value.

The first value may be one of a data value of one (1) and a data value of zero (0), and the second value is the other of the data value of one (1) and the data value of zero (0).

The processing method may also comprise decoding each encoded variable length data structure. This may comprise checking for continuation data values that denote the beginning and the end of each of the one or more encoded variable length data structures, skipping any fixed length unencoded fields in between encoded variable length data structures. Still further, the decoding step may comprise removing any continuation data values added during the encoding process, and concatenating two or more blocks after removal of any continuation data values, when the variable length data structure comprises more than one block.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

While principles of the present invention will be described herein in the context of a practical, real-world application such as a database record management system, the invention is not so limited. It is also to be understood that the invention is not intended to be limited to any particular type of data that the database stores (e.g., employee, financial, demographic, geographic records, etc.). Also, although not limited thereto, principles of the application are particularly suitable for implementation in a DB2 database system (IBM Corporation, Armonk N.Y.) or the like. Also, it is to be appreciated that a "bit" illustratively referred to herein is either a "one" (1) or a "zero" (0) in accordance with a binary numbering system.

Figure 1:
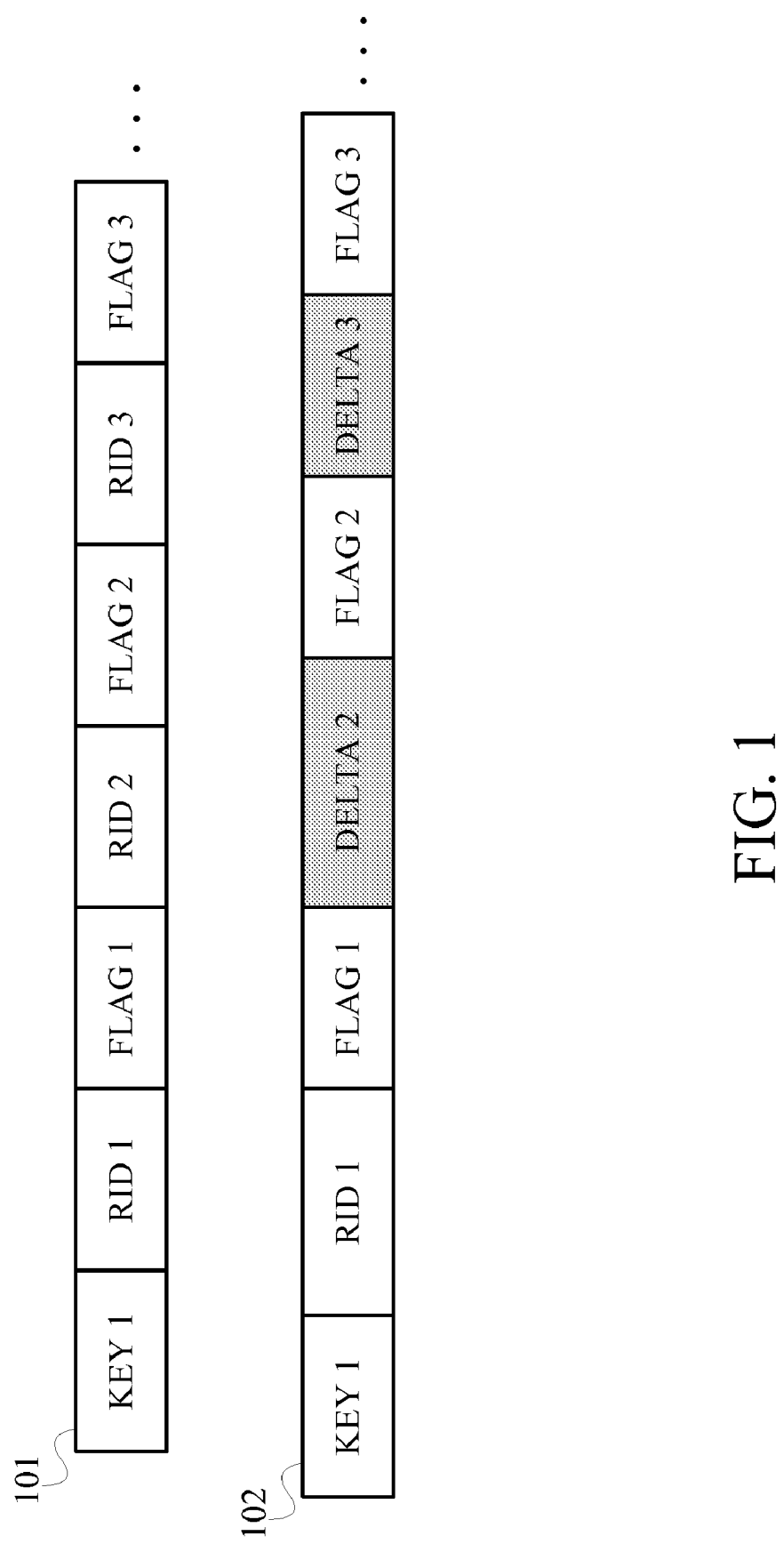
FIG. 1 shows an exemplary RID list in an uncompressed domain and an exemplary delta encoded variable length RID list in a compressed domain.

FIG. 1 shows an exemplary RID list 101 in the uncompressed domain and an exemplary delta encoded variable length RID list 102 in the compressed domain. In both cases, a fixed-length flag structure (e.g., RIDFlags) immediately follows each RID or delta. As mentioned above, the flag structure is used for recording status information and the like pertaining to the corresponding record.

Figure 2:
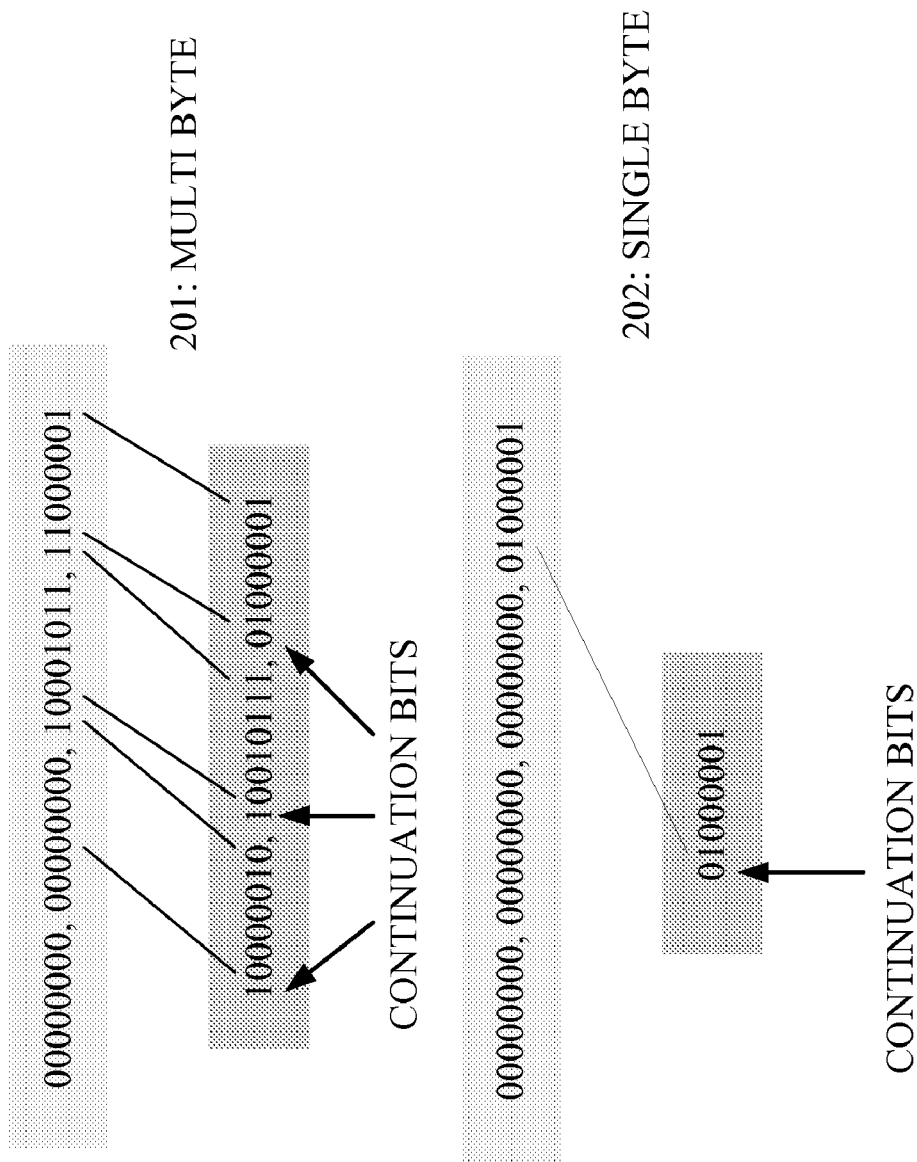
FIG. 2 shows an example variable length encoding of a 32 bit integer using one bit per byte.

FIG. 2 shows an example variable length encoding of a 32 bit integer using one bit per byte. The continuation bit for each byte other than the last one is set to one, and the continuation bit is set to zero in the last byte. Reference numeral 201 shows how a value of more than one byte would be encoded. Reference numeral 202 shows how a value of one byte would be encoded. In both cases, the continuation bit of the last byte (the only byte, in the case of 202) is set to zero, and the continuation bits of bytes that are not the last byte are set to one.

Figure 3:
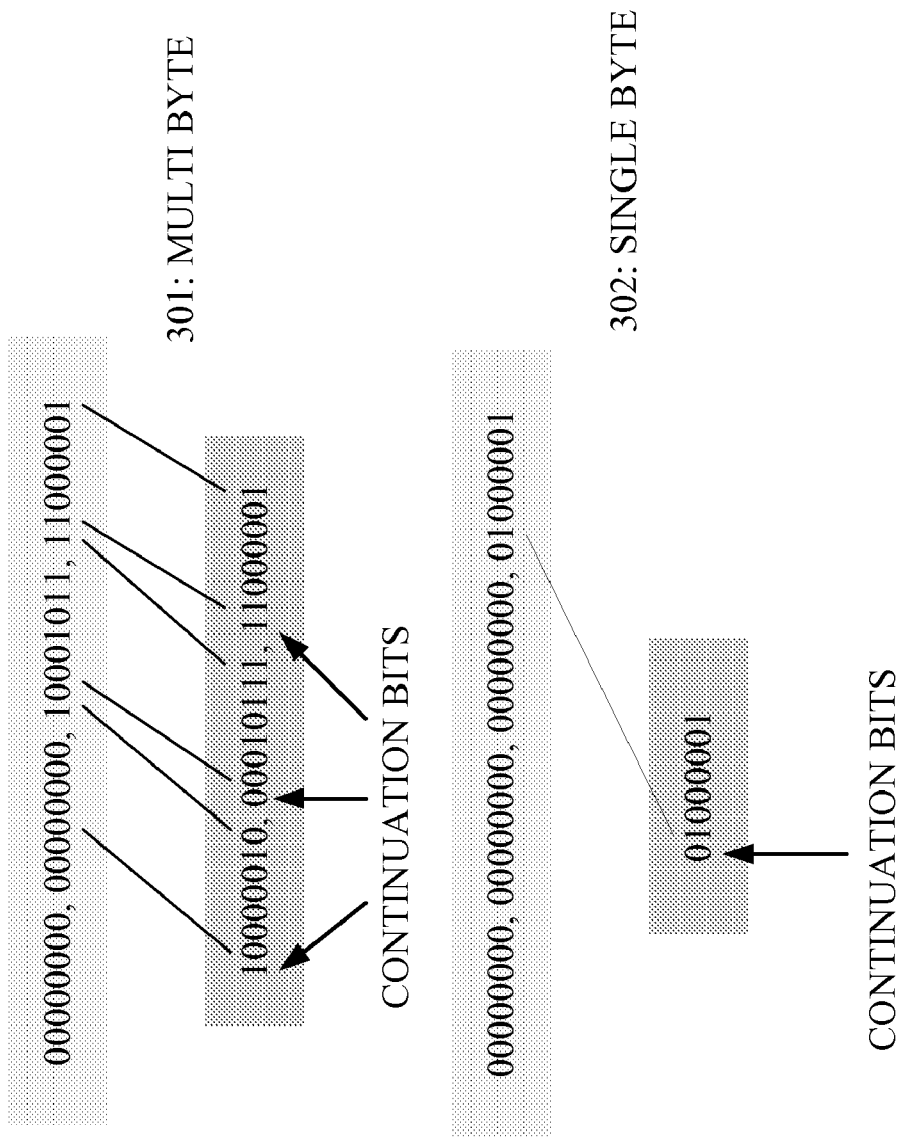
FIG. 3 shows an example encoding process according to an embodiment of the invention for the same 32 bit integer of FIG. 2 using one bit per byte.

In contrast, FIG. 3 shows an example of an encoding methodology, according to an embodiment of the invention, for the same 32 bit integer (as in FIG. 2) using one bit per byte. Reference numeral 301 shows how a value of more than one byte would be encoded, where the continuation bits of the first and last byte are set to one and the continuation bits of all intermediate bytes (one, in this example) are set to zero. Reference numeral 302 shows how a value of one byte would be encoded, wherein the continuation bit is set to zero in order to distinguish this byte from the first byte of a multi-byte value. This facilitates bi-directional scans.

We now explain in detail the overall process employed to generate the encoding of FIG. 3, as well as an overall decoding process.

The first step overall is to choose or determine a block size for which we are going to have a bit as code. It could be at the byte level or a set of bytes. Then, the following method for encoding and decoding lists of variable length structures made up of blocks is implemented.

In the encoding step, the process encodes each variable length structure (i.e., payload) in the list using a variable byte encoding method, except that, if the variable byte encoded value comprises more than one byte (or block), the continuation bit is set to one only in the first and last byte (or block), and if the variable byte encoded value comprises exactly one byte (or block), the continuation bit of that one byte (or block) is set to zero.

Figure 4:
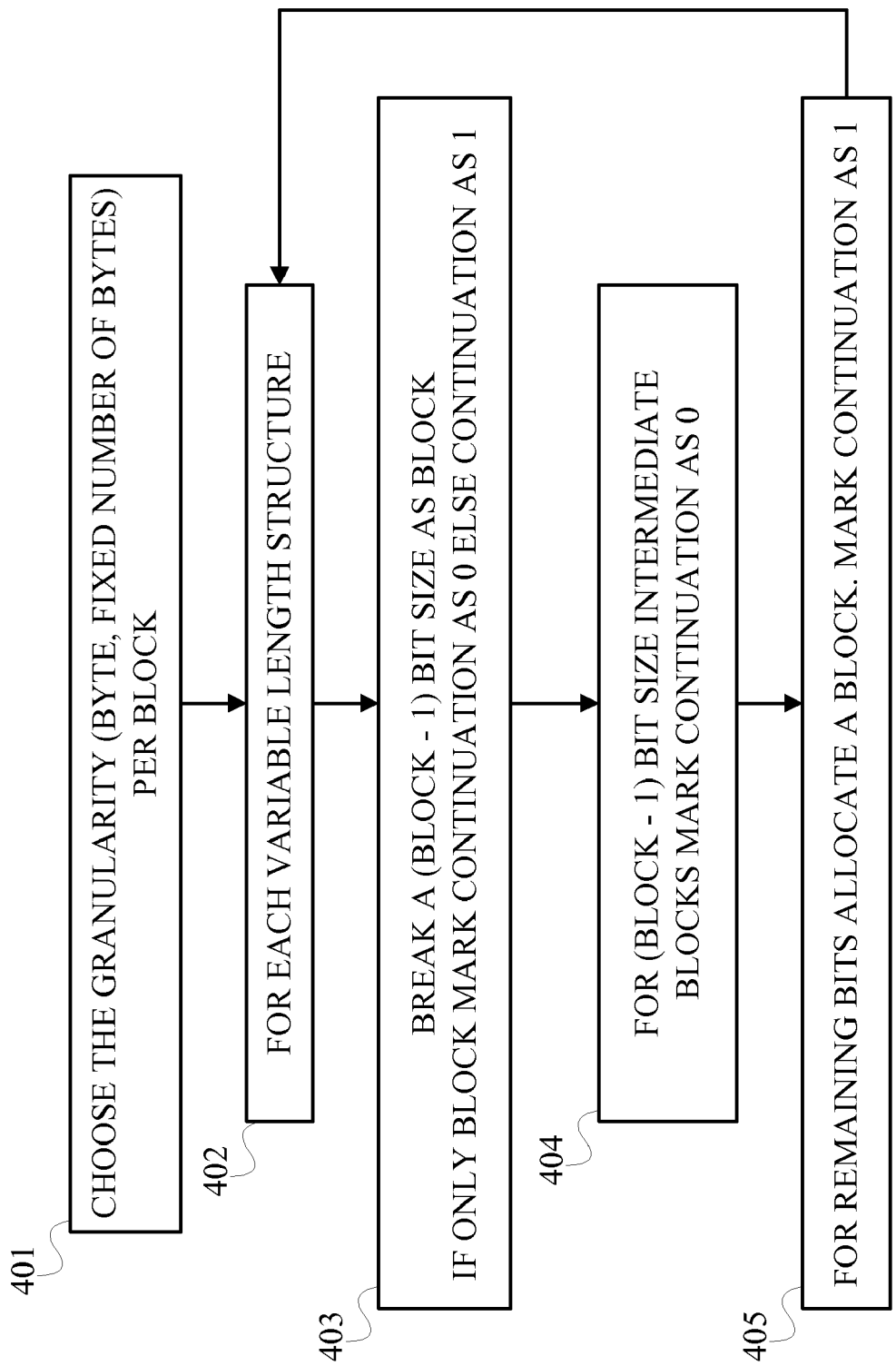
FIG. 4 shows an operational flow diagram illustrating an overall exemplary encoding process according to an embodiment of the invention.

Thus as shown in FIG. 4, after choosing the granularity per block (401), the encoding process proceeds for each variable length structure (402) as follows. Step 403 calls for breaking (block-1) bits out of the variable length structure and adding a one for the extra continuation bit. For all intermediate blocks of size (block-1) that can be extracted from the structure, if any, the process adds zero as the extra continuation bit (404). For the final remaining bits, the process allocates block bits and marks the continuation bit as one (405).

Thus, we end up with blocks of size (block) with, if there are more than one block, the first and last blocks marked with one as continuation and with the remaining intermediate blocks marked with zero as continuation, or, if there is exactly one block, that block marked with zero as continuation. Using a zero to indicate that there is just one byte (or block) is necessary, so that the decoding can distinguish between the cases of a byte (or block) being the first of several blocks, and the block being the only block. FIG. 3 shows the result of this method of encoding.

In the decoding step, the process decodes each payload by checking for the continuation bit that denotes the beginning and the end of the encoded payload. If the scan is forward, then the first block considered will be the leftmost block of a value, and each succeeding block (if any) will be one block to the right. If the scan is reverse, then the first block considered will be the rightmost block of the value, and each succeeding block (if any) will be one block to the left. If the continuation bit of the first block considered is zero, this indicates that the entire value comprises just that one block, and the decoding is complete. Else, if the continuation bit of the first block considered is one, this indicates that this is the first block of a series of more than one block, and subsequent contiguous blocks are considered until a block with a continuation bit value of one is again encountered. That block is understood to be the final block in the series of blocks, with each intermediate block being marked with a zero in its continuation bit.

Figure 5:
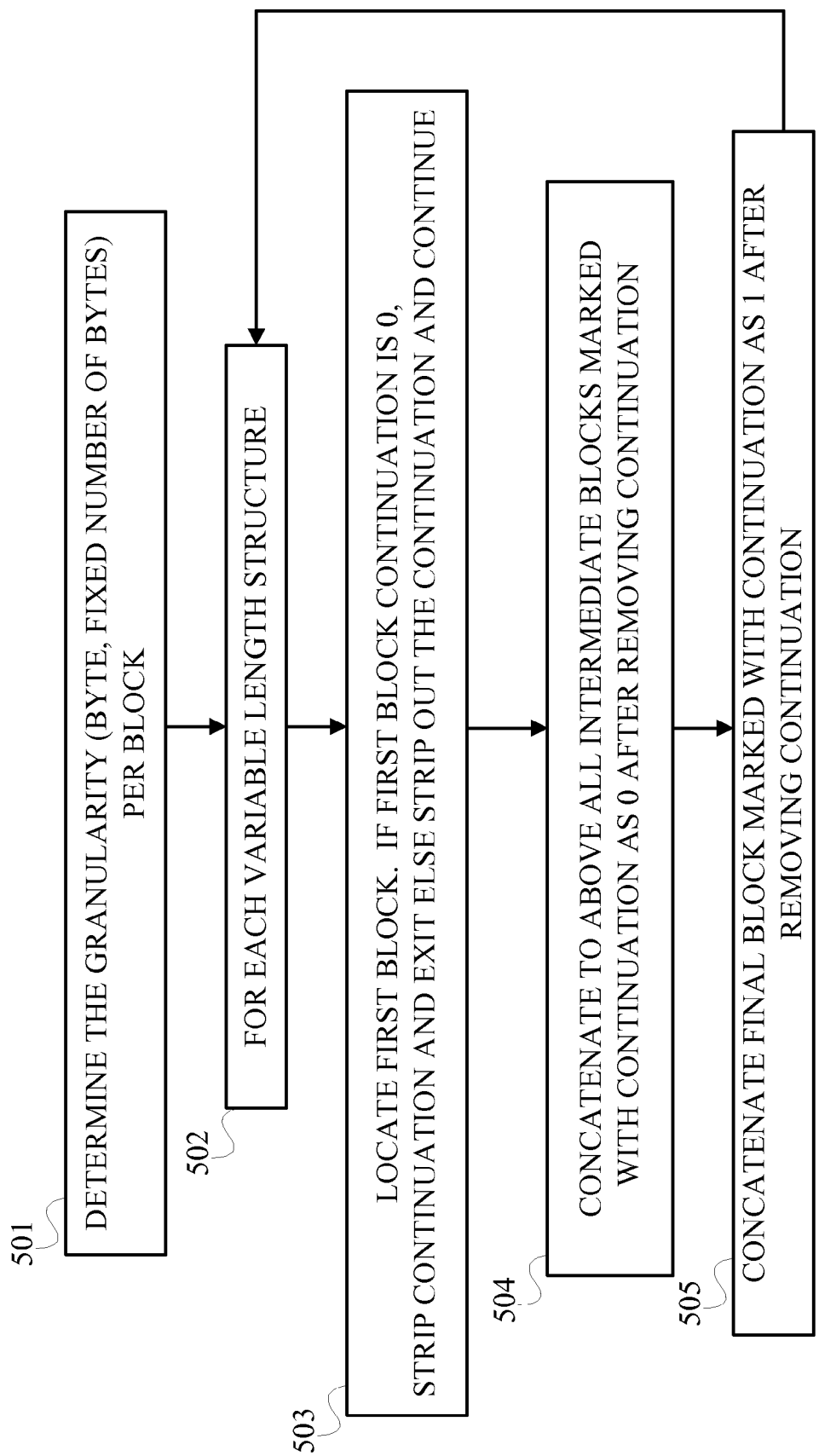
FIG. 5 shows an operational flow diagram illustrating an overall exemplary decoding process according to an embodiment of the invention.

Thus as shown in FIG. 5, after choosing the granularity per block (501), the decoding process proceeds for each variable length structure (502) as follows. Step 503 calls for getting the first block of the variable length structure marked with continuation bit one and extracting the payload of (block-1) bits (extracting payload effectively means removing continuation bit therefrom). To this, the process concatenates the extracted payload of (block-1) bits of the intermediate blocks marked with continuation bit zero (504). The process then locates the final block marked with continuation bit one and concatenates its extracted payload to that obtained from before to get the final variable length structure (505).

Thus, advantageously, the decoding step checks for continuation data values that denote the beginning and the end of the encoded payload, and skips any fixed length unencoded fields in between payloads.

It is to be appreciated that the value of one to indicate the first and last block, zero to indicate a single block, and zero to indicate an intermediate block is arbitrary. Zero could be used instead wherever one is used in the above description, and one could be used wherever zero is used in the above description.

Figure 6:
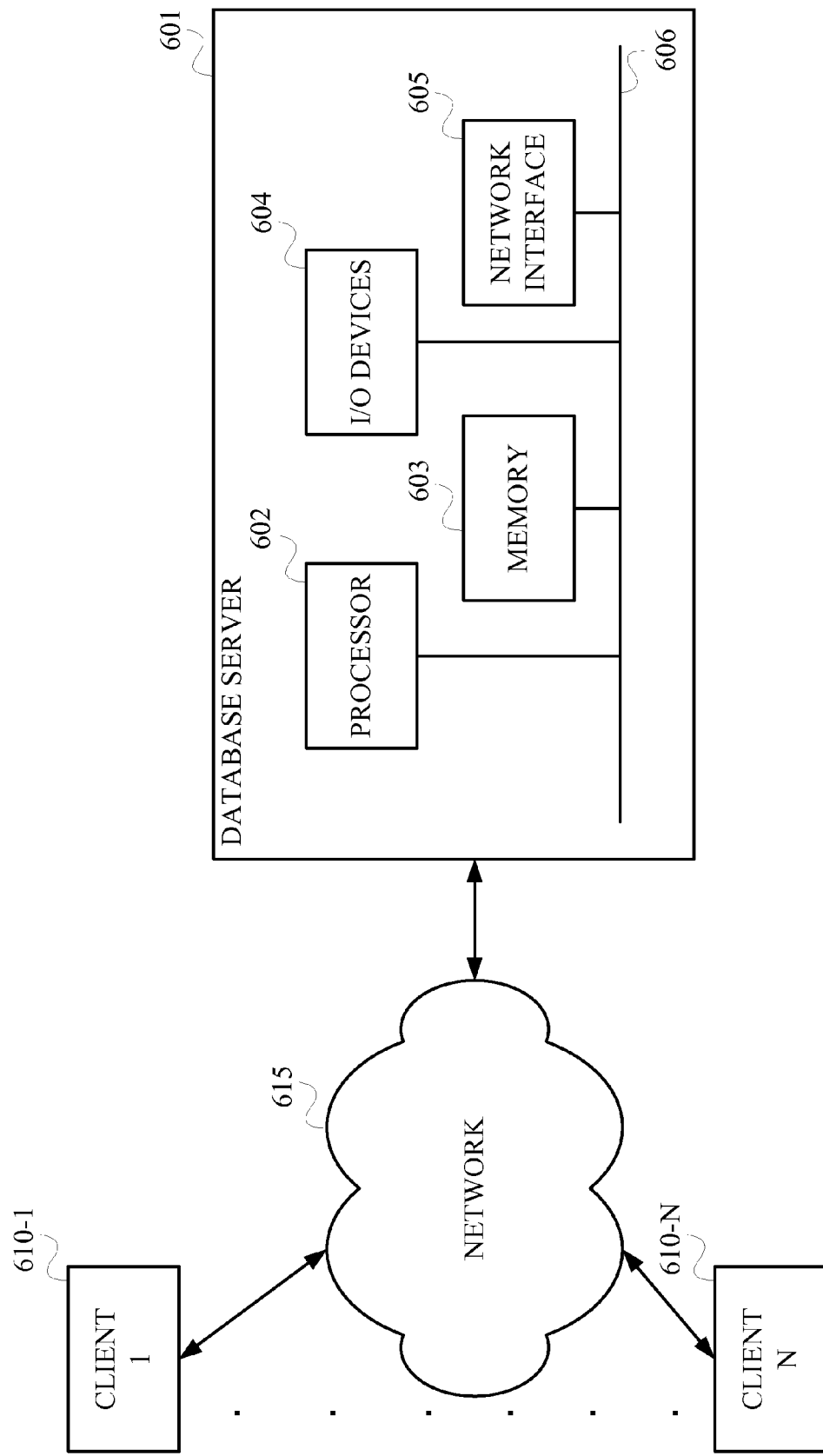
FIG. 6 shows a block diagram of an exemplary database server and network environment in which exemplary processes of the present invention may be implemented.

FIG. 6 shows a block diagram of an exemplary database record management system in which an exemplary process of the present invention may be implemented. More particularly, FIG. 6 illustrates a database server 601 which receives queries and/or data from one or more clients 610-1 through 610-N over network 605 (e.g., internet or intranet). It is assumed that database server 601 hosts a database record management system which is configured to implement a database access methodology including encoding and decoding, according to principles of the invention.

That is, FIG. 6 illustrates a computer system (in the form of a database server) in accordance with which one or more components/steps of the techniques (e.g., components and methodologies described above in the context of FIGS. 1 through 5) may be implemented, according to an embodiment of the invention.

It is to be understood that the individual components/steps may be implemented on one such computer system or on more than one such computer system. In the case of an implementation on a distributed computing system, the individual computer systems and/or devices may be connected via a suitable public network. However, the system may be realized via private or local networks. In any case, the invention is not limited to any particular network.

As shown, the computer system includes processor 602, memory 603, input/output (I/O) devices 604, and network interface 605, coupled via a computer bus 606 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer or machine readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for processing one or more variable length data structures, the method comprising the steps of:
    obtaining each variable length data structure, wherein each variable length structure comprises one or more data blocks; and
    applying a variable length encoding process to the one or more blocks of each variable length data structure comprising setting a continuation data value in each block to a first value or a second value, wherein the setting of the continuation data values enables bi-directional scanning of each variable length structure,
    wherein, when a variable length data structure has more than one block, the application of the variable length encoding process comprises setting the continuation data values in the first block and the last block of the variable length structure to the first value,
    wherein, when the variable length data structure has more than one block, the application of the variable length encoding process comprises setting the continuation data value in any intermediate block of the variable length structure to the second value, and
    wherein, when a variable length data structure has one block, the application of the variable length encoding process comprises setting the continuation data value in the one block of the variable length structure to the second value.

2. The method of claim 1, wherein the first value is one of a data value of one and a data value of zero, and the second value is the other of the data value of one and the data value of zero.

3. The method of claim 1, further comprising the step of decoding each encoded variable length data structure.

4. The method of claim 3, wherein the decoding step further comprises:
    checking for continuation data values that denote the beginning and the end of each of the one or more encoded variable length data structures; and
    skipping any fixed length unencoded fields in between encoded variable length data structures.

5. The method of claim 4, wherein when the bi-directional scanning comprises a forward direction scan, the first block considered for each variable length data structure is the leftmost block, and each succeeding block, if any, is one block to the right.

6. The method of claim 4, wherein when the bi-directional scanning comprises a reverse direction scan, the first block considered for each variable length data structure is the rightmost block, and each succeeding block, if any is one block to the left.

7. The method of claim 4, wherein when the continuation data value of the first block for a variable length data structure considered is the second value, this indicates that the entire variable length data structure comprises only that one block, and the decoding step is complete.

8. The method of claim 4, wherein when the continuation data value of the first block for a variable length data structure considered is the first value, this indicates that this is the first block of a series of more than one block, and subsequent contiguous blocks are considered until a block with a continuation data value of the first value is again encountered, which is understood to be the final block in the series of blocks, with each intermediate block being marked with the second value in its continuation data value.

9. The method of claim 3, wherein the decoding step further comprises:

removing any continuation data values added during the encoding process; and concatenating two or more blocks after removal of any continuation data values, when the variable length data structure comprises more than one block.

10. The method of claim 1, wherein the one or more variable length data structures comprise a plurality of delta encoded integers associated with a database index.

11. The method of claim 10, wherein a delta encoded integer represents a difference between a first row identifier in the database index and a second row identifier in the database index.

12. An article of manufacture for processing one or more variable length data structures comprising a computer readable storage medium including program instructions stored thereon which when executed by a computer implement a method comprising:

obtaining each variable length data structure, wherein each variable length structure comprises one or more data blocks; and applying a variable length encoding process to the one or more blocks of each variable length data structure comprising setting a continuation data value in each block to a first value or a second value, wherein the setting of the continuation data values enables bi-directional scanning of each variable length structure, wherein, when a variable length data structure has more than one block, the application of the variable length encoding process comprises setting the continuation data values in the first block and the last block of the variable length structure to the first value, wherein, when the variable length data structure has more than one block, the application of the variable length encoding process comprises setting the continuation data value in any intermediate block of the variable length structure to the second value, and wherein, when a variable length data structure has one block, the application of the variable length encoding process comprises setting the continuation data value in the one block of the variable length structure to the second value.

13. The article of claim 12, further comprising program instructions for decoding each encoded variable length data structure.

14. The article of claim 13, wherein the decoding further comprises:

checking for continuation data values that denote the beginning and the end of each of the one or more encoded variable length data structures; and skipping any fixed length unencoded fields in between encoded variable length data structures.

15. The article of claim 14, wherein when the bi-directional scanning comprises a forward direction scan, the first block considered for each variable length data structure is the leftmost block, and each succeeding block, if any, is one block to the right.

16. The article of claim 14, wherein when the bi-directional scanning comprises a reverse direction scan, the first block considered for each variable length data structure is the rightmost block, and each succeeding block, if any is one block to the left.

17. The article of claim 14, wherein when the continuation data value of the first block for a variable length data structure considered is the second value, this indicates that the entire variable length data structure comprises only that one block, and the decoding step is complete.

18. The article of claim 14, wherein when the continuation data value of the first block for a variable length data structure considered is the first value, this indicates that this is the first block of a series of more than one block, and subsequent contiguous blocks are considered until a block with a continuation data value of the first value is again encountered, which is understood to be the final block in the series of blocks, with each intermediate block being marked with the second value in its continuation data value.

19. Apparatus for processing one or more variable length data structures, the apparatus comprising:

a memory; and at least one processor coupled to the memory and operative to:

obtain each variable length data structure, wherein each variable length structure comprises one or more data blocks; and apply a variable length encoding process to the one or more blocks of each variable length data structure comprising setting a continuation data value in each block to a first value or a second value, wherein the setting of the continuation data values enables bi-directional scanning of each variable length structure, wherein, when a variable length data structure has more than one block, the application of the variable length encoding process comprises setting the continuation data values in the first block and the last block of the variable length structure to the first value, wherein, when the variable length data structure has more than one block, the application of the variable length encoding process comprises setting the continuation data value in any intermediate block of the variable length structure to the second value, and wherein, when a variable length data structure has one block, the application of the variable length encoding process comprises setting the continuation data value in the one block of the variable length structure to the second value.

20. The apparatus of claim 19, wherein the first value is one of a data value of one and a data value of zero, and the second value is the other of the data value of one and the data value of zero.

* * * * *